United States Patent
Sheng

[11] Patent Number: 6,068,290
[45] Date of Patent: May 30, 2000

[54] INFLATOR STRUCTURE

[75] Inventor: Jianping Sheng, Rochester Hills, Mich.

[73] Assignee: TRW Vehicle Safety System Inc., Lyndhurst, Ohio

[21] Appl. No.: 08/996,660

[22] Filed: Dec. 23, 1997

[51] Int. Cl.[7] .................................................. B60R 21/26
[52] U.S. Cl. .......................................... 280/736; 280/741
[58] Field of Search .................................... 280/741, 742, 280/736

[56] References Cited

U.S. PATENT DOCUMENTS

| | | |
|---|---|---|
| 3,721,456 | 3/1973 | McDonald . |
| 3,723,205 | 3/1973 | Scheffee . |
| 3,813,007 | 5/1974 | Doin et al. . |
| 3,817,263 | 6/1974 | Bendler et al. . |
| 4,066,415 | 1/1978 | Kasama et al. ......................... 422/165 |
| 4,158,696 | 6/1979 | Wilhelm . |
| 5,184,846 | 2/1993 | Goetz . |
| 5,219,178 | 6/1993 | Kobari et al. . |
| 5,411,290 | 5/1995 | Chan et al. .............................. 280/737 |
| 5,466,420 | 11/1995 | Parker et al. . |
| 5,716,072 | 2/1998 | O'Driscoll .............................. 280/740 |

FOREIGN PATENT DOCUMENTS

| | | |
|---|---|---|
| 000639483A1 | 2/1995 | European Pat. Off. . |
| 4009551 | 9/1991 | Germany ................................ 280/736 |
| 6298035 | 10/1994 | Japan .................................... 280/736 |

*Primary Examiner*—Paul N. Dickson
*Attorney, Agent, or Firm*—Tarolli, Sundheim, Covell, Tummino & Szabo L.L.P.

[57] ABSTRACT

An inflator (10) for an inflatable vehicle occupant protection device, such as an air bag, includes a housing (12) storing a non-pressurized source (16) of inflation fluid. The source (16) of inflation fluid is an elongated body (16) of ignitable material which, when ignited, generates combustion products including inflation gas and particulate matter. An imperforate tubular wall portion (20) of the housing (12) has an inner surface (66) extending fully along and around the elongated body (16) of ignitable material. The inner surface (66) functions to remove particulate matter from the inflation gas. The housing (12) further contains a tubular filter structure (120) formed of gas-permeable material for removing additional particulate matter from the inflation gas. The tubular filter structure (120) is substantially shorter than the elongated body (16) of ignitable material.

20 Claims, 2 Drawing Sheets

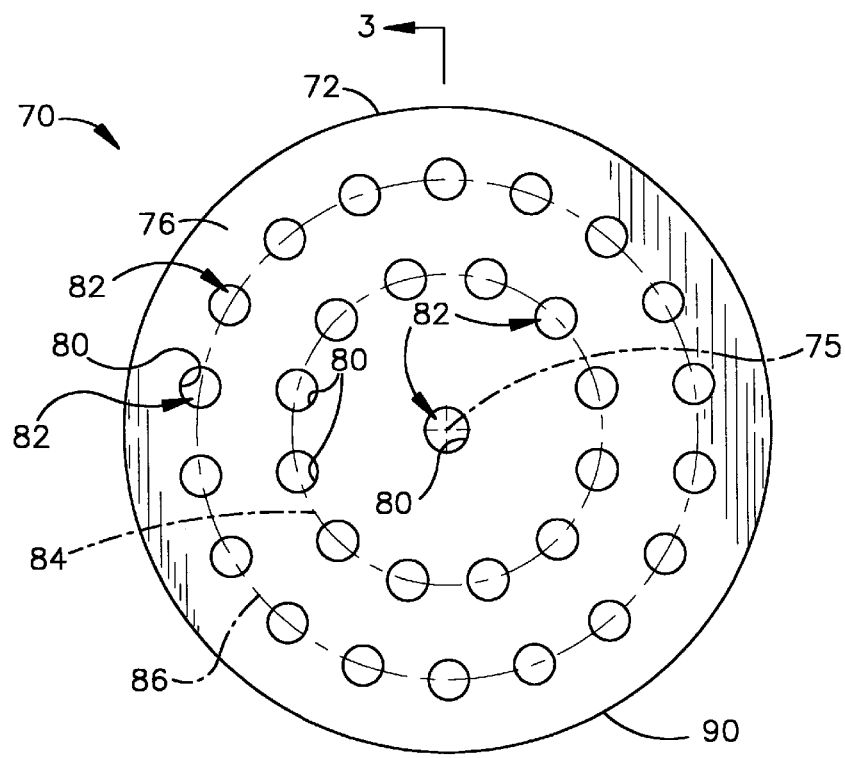
Fig.2
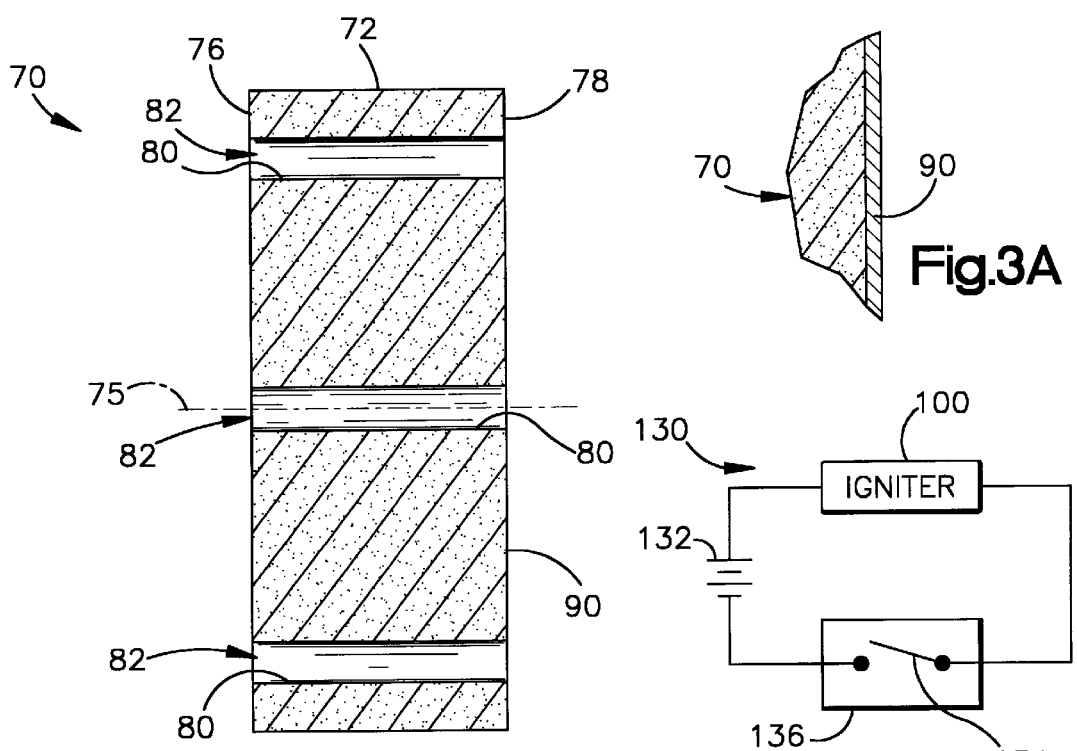
Fig.3
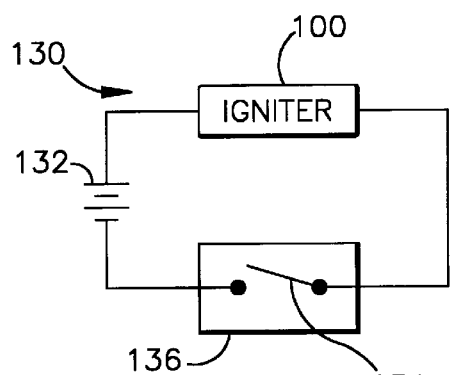
Fig.3A
Fig.4

INFLATOR STRUCTURE

FIELD OF THE INVENTION

The present invention relates to an inflator for an inflatable vehicle occupant protection device.

BACKGROUND OF THE INVENTION

An inflator for an inflatable vehicle occupant protection device, such as an air bag, stores a source of inflation fluid. The source of inflation fluid stored in the inflator may be pressurized or non-pressurized. For example, a pressurized source of inflation fluid may comprise pressurized fluid, or a combination of pressurized fluid and ignitable material for heating the pressurized fluid. A non-pressurized source of inflation fluid may comprise a solid, ignitable gas generating material. Such gas generating material is ignited when the vehicle experiences a collision or other condition for which inflation of the air bag is desired to protect an occupant of the vehicle. As the gas generating material burns, it generates a large volume of inflation gas which is directed to flow from the inflator into the air bag to inflate the air bag.

The gas generating material is commonly stored in an elongated cylindrical inflator housing. The housing includes an inner tubular wall and an outer tubular wall.

A tubular filter is contained in the housing concentrically between the tubular walls.

The inner tubular wall defines a cylindrical combustion chamber in which the gas generating material is contained. A plurality of gas flow openings extend through the inner tubular wall. The gas flow openings direct the inflation gas to flow radially outward from the combustion chamber and through the filter toward the outer tubular wall. The filter removes particulate matter from the inflation gas, and also cools the inflation gas, as the inflation gas flows radially outward toward the outer tubular wall. A plurality of gas outlet openings extending through the outer tubular wall direct the gas to flow radially outward from the housing toward the air bag.

SUMMARY OF THE INVENTION

In accordance with the present invention, an inflator comprises a housing storing a non-pressurized source of inflation fluid. The source of inflation fluid comprises an elongated body of ignitable material. When the elongated body of ignitable material is ignited, it generates combustion products including inflation gas and particulate matter.

The housing has an imperforate tubular wall portion with an inner surface extending fully along and around the elongated body of ignitable material. The inner surface comprises means for removing particulate matter from the inflation gas. The housing further contains a tubular filter structure comprising gas-permeable material for removing additional particulate matter from the inflation gas. The tubular filter structure is substantially shorter than the elongated body of ignitable material.

The present invention enables an inflator to be constructed efficiently and economically with a minimal amount of gas-permeable filter material. This is because the inner surface of the imperforate tubular housing wall functions as a particulate-deposition surface along the entire length, and around the entire circumference, of the elongated body of ignitable gas generating material. The inner surface removes most of the particulate matter from the inflation gas before the inflation gas reaches the tubular filter, and thus enables the tubular filter to be smaller, i.e., shorter, than the elongated body of ignitable material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is an enlarged view of a part of the inflator of FIG. 1;

FIG. 3 is a view taken on line 3—3 of FIG. 2;

FIG. 3A is an enlarged partial view of the part shown in FIG. 3; and

FIG. 4 is a schematic view of an electrical circuit including a part of the inflator of FIG. 1.

DESCRIPTION OF A PREFERRED EMBODIMENT

Figure 1:
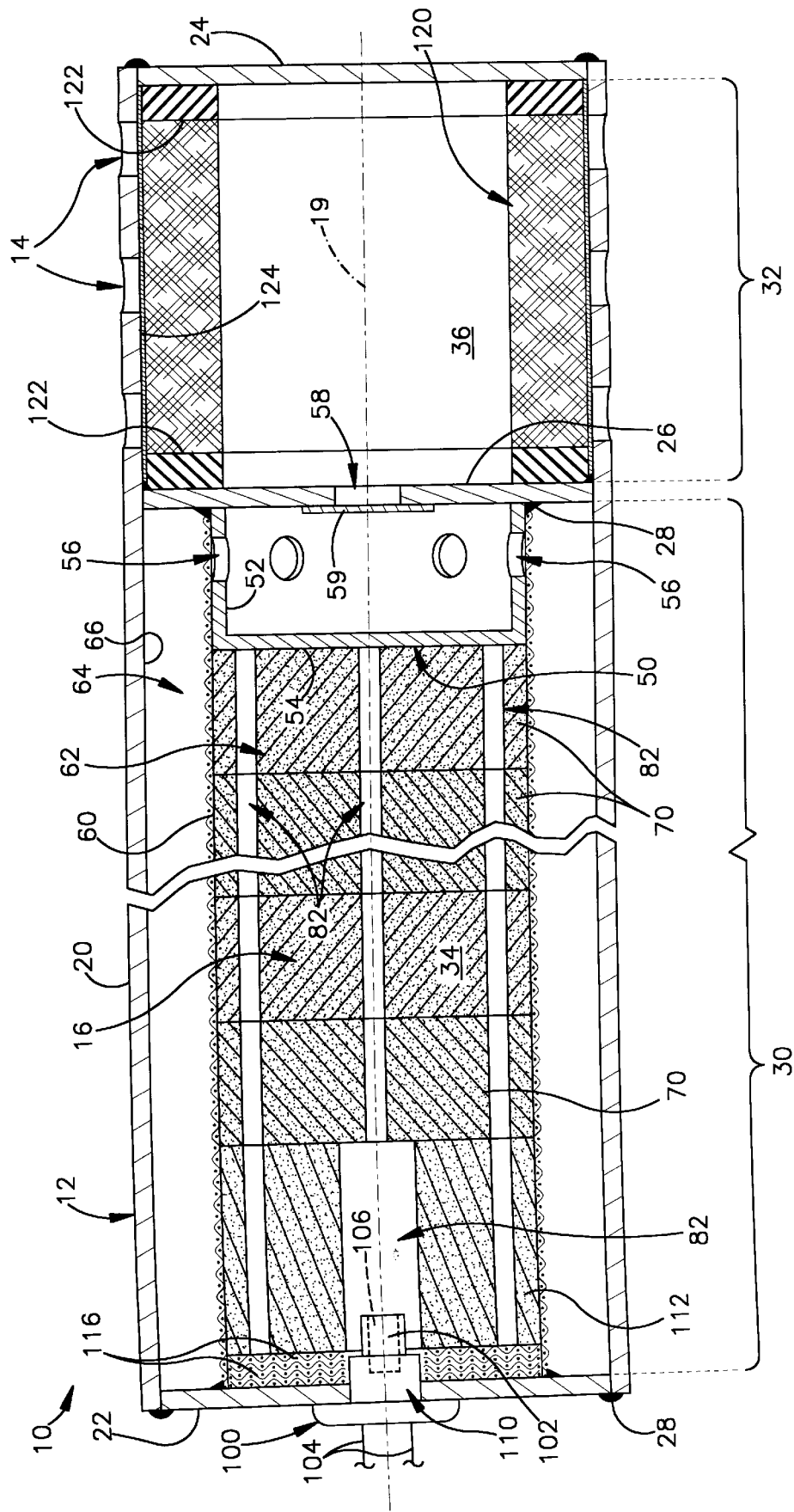
FIG. 1 is a sectional view of an inflator comprising a preferred embodiment of the present invention.

An inflator 10 comprising a preferred embodiment of the present invention is shown in FIG. 1. The inflator 10 includes a housing 12 with a plurality of outlet openings 14. The housing 12 stores a source of inflation fluid for inflating a vehicle occupant protection device (not shown) such as an air bag. In the preferred embodiment of the invention, the source of inflation fluid stored in the housing 12 is non-pressurized and consists of an elongated, cylindrical body 16 of ignitable gas generating material. When the inflator 10 is actuated, the body 16 of gas generating material is ignited and rapidly generates combustion products including heat, particulate matter and a large volume of inflation gas. The housing 12 is designed for chemical deposition of combustion products, and also to remove particulate matter from the inflation gas, before the inflation gas emerges from the housing 12 through the outlet openings 14.

The housing 12 has an elongated cylindrical shape with a longitudinal central axis 19. The cylindrical shape of the housing 12 is defined by a tubular body wall 20 and a pair of circular opposite end walls 22 and 24. A circular intermediate wall 26 of the housing 12 is located within the body wall 20 at a location near the second end wall 24. The walls 20–26, as well as other parts of the housing 12 described below, are interconnected and sealed in a known manner, such as by a plurality of welds 28.

The body wall 20 of the housing 12 has first and second longitudinal sections 30 and 32. The first longitudinal section 30 of the body wall 20 is imperforate, and extends axially from the first end wall 22 to the intermediate wall 26. The first longitudinal section 30 thus defines the length and diameter of a cylindrical combustion chamber 34 which is located axially between those walls 22 and 26.

The second longitudinal section 32 of the body wall 20 extends axially from the intermediate wall 26 to the second end wall 24. Accordingly, the second section 32 is substantially shorter than the first section 30, and defines the length and diameter of a cylindrical filter chamber 36 which is substantially shorter than the combustion chamber 34. The outlet openings 14 are arranged in a plurality of rows extending circumferentially around the second section 32 of the body wall 20.

The housing 12 further includes a nozzle cup 50 which is mounted on the intermediate wall 26. The nozzle cup 50 projects axially into the combustion chamber 34, and has a short cylindrical shape defined by a tubular side wall 52 and a circular end wall 54. A plurality of gas flow openings 56 are arranged in a row extending circumferentially around the side wall 52 of the nozzle cup 50. A single gas flow opening 58 extends through the center of the intermediate wall 26. A sheet of burst foil 59 covers the opening 58. The burst foil 59 provides a hermetic seal for the body 16 of gas generating material, and also helps to pressurize the combustion chamber 34 to promote rapid ignition of the body 16 of gas generating material, as described below.

A wire mesh screen 60 is located within the combustion chamber 34. The screen 60 has a tubular shape centered on the axis 19, and extends axially along the entire length of the combustion chamber 34 from the first end wall 22 to the intermediate wall 26. The screen 60 separates a cylindrical central portion 62 of the combustion chamber 34 from a tubular peripheral portion 64. The peripheral portion 64 of the combustion chamber 34 is a gas flow plenum which is preferably fully open and free of obstructions to the flow of gas. A cylindrical inner surface 66 of the body wall 20 extends continuously around the entire circumference, and along the entire length, of the combustion chamber 34. The inner surface 66 of the body wall 20 thus defines a closed outer boundary of the plenum 64.

As noted above, the gas generating material in the housing 12 has the configuration of an elongated cylindrical body 16. The body 16 of gas generating material is defined by a plurality of separate, shorter cylindrical bodies 70 of gas generating material which are known as grains. The gas generating material may have any suitable composition known in the art, and the grains 70 may have any suitable configuration known in the art.

As an example of the different grains of gas generating material that can be used in accordance with the present invention, the configuration of one such grain 70 is shown in detail in FIGS. 2 and 3. The grain 70 has a cylindrical outer surface 72 centered on an axis 75. The diameter of the outer surface 72 is substantially equal to the inner diameter of the tubular screen 60 (FIG. 1) in the housing 12. The grain 70 further has a pair of circular opposite side surfaces 76 and 78. Each of the side surfaces 76 and 78 has a planar contour which is generally perpendicular to the axis 75.

The grain 70 preferably has a plurality of cylindrical inner surfaces 80, each of which defines a respective cylindrical passage 82 extending axially through the grain 70. The number and arrangement of the cylindrical inner surfaces 80 may vary. As shown by way of example in FIGS. 2 and 3, one of the cylindrical inner surfaces 80 is centered on the axis 75, and the other cylindrical inner surfaces 80 are arranged in first and second circular arrays. The first circular array of the cylindrical inner surfaces 80 extends circumferentially around the axis 75 on a first circular line 84. The first circular line 84 is centered on the axis 75. The second circular array of the cylindrical inner surface 80 extends circumferentially around the axis 75 on a second circular line 86. The second circular line 86 also is centered on the axis 75, and is spaced radially outward from the first circular line 84. Moreover, each cylindrical inner surface 80 in the second circular array is at least partially offset circumferentially from each cylindrical inner surface 80 in the first circular array.

Each grain 70 of gas generating material has an optional coating 90 (FIG. 3A) formed of a pyrotechnic material for enhancing ignition of the gas generating material. As known in the art, such a pyrotechnic material does not generate a significant amount of gas for inflating the air bag, but is more readily ignitable than the gas generating material of which the grains 70 are formed. An ignition-enhancing pyrotechnic material may also be provided in the form of one or more small bodies within, or adjacent to, the body 16 of gas generating material.

As shown in FIG. 1, the grains 70 of gas generating material are received in the central portion 62 of the combustion chamber 34 coaxially within the tubular screen 60. The tubular screen 60 supports the grains 70 in the configuration of the elongated cylindrical body 16.

The inflator 10 further includes an igniter 100 for igniting the body 16 of gas generating material. As shown by way of example in FIG. 1, the igniter 100 is a known part comprising a cylindrical casing 102 and a pair of electrical lead wires 104. A small charge of pyrotechnic material 106 (shown schematically) is contained in the casing 102. The pyrotechnic material 106 is ignited upon the passage of electric current through the igniter 100 between the lead wires 104. When the pyrotechnic material is ignited, it produces combustion products which rupture the casing 102 and emerge rapidly from the casing 102.

The igniter 100 is received closely through an opening 110 at the center of the first end wall 22 of the housing 12, and projects a short distance into the housing 12 along the axis 19. The igniter 100 thus projects a short distance into the central portion 62 of the combustion chamber 34 adjacent to one end of the body 16 of gas generating material. Preferably, an atypical end grain 112 of gas generating material is provided at that end of the body 16. The end grain 112 has an enlarged central passage 82 which enables the igniter 100 to project a short distance axially into the body 16. A plurality of wire mesh screens 116 provide a cushion between the end grain 112 and the first end wall 22 of the housing 12. The grain 70 at the opposite end of the body 16 abuts the end wall 54 of the nozzle cup 50.

A filter 120 is contained in the filter chamber 36. The filter 120 has a tubular cylindrical shape centered on the axis 19, and fits closely within the second longitudinal section 32 of the tubular body wall 20. In accordance with a particular feature of the present invention, the filter 120 is substantially shorter than the elongated body 16 of gas generating material. Preferred materials for the filter 120 include wire mesh screen, steel wool, and ceramic/glass wool, as known in the art. The filter 120 thus has a gas-permeable structure for capturing particulate matter from inflation gas flowing radially outward through the filter 120 toward the outlet openings 14. A pair of annular seals 122 block particulate matter from bypassing the filter 120 at the opposite ends of the filter chamber 36. The seals 122 may be formed of any suitable material known in the art, such as an elastomeric material.

An optional sheet 124 of rupturable pressure controlling material, which is preferably formed of aluminum, is adhered to the second longitudinal section 32 of the tubular body wall 20. The sheet 124 extends circumferentially around the filter chamber 36 in continuous contact with the body wall 20, and thus extends across the outlet openings 14 between the filter 120 and the body wall 20. The sheet 124 ruptures to release inflation gas from the filter chamber 36 when the pressure of the inflation gas in the filter chamber 36 reaches a predetermined elevated level. The sheet 124 also provides a hermetic seal for protecting the filter 120 from contaminants.

When the inflator 10 is installed in a vehicle, the igniter 100 is included in an electrical circuit 130, as shown schematically in FIG. 2. The electrical circuit 130 further includes a power source 132, which is preferably the vehicle battery and/or a capacitor, and a normally open switch 134. The switch 134 is preferably part of a sensor 136 which senses a vehicle condition indicative of a collision. The collision-indicating condition may comprise, for example, vehicle deceleration that is caused by a collision. If the collision-indicating condition meets or exceeds a predetermined threshold, it indicates the occurrence of a collision for which inflation of the air bag or other inflatable device is desired to help protect an occupant of the vehicle. The sensor 136 closes the switch 134 upon sensing such a collision-indicating condition.

When the switch 134 in the circuit 130 is closed, electric current is directed through the igniter 100 between the lead wires 104. The pyrotechnic material 106 in the casing 102 is then ignited and, as described above, spews combustion products into the combustion chamber 34.

The combustion products emerging from the casing 102 move against and ignite the end grain 112 and the first adjacent grain 70 of gas generating material in the combustion chamber 34.

The first two grains 112 and 70 of gas generating material rapidly generate inflation gas as a combustion product. They also produce and emit additional combustion products including heat and particulate matter. Some of those combustion products move into contact with the next adjacent grain 70 of gas generating material in the elongated body 16. As a result, the next adjacent grain 70 of gas generating material is ignited and, in turn, emits additional combustion products. This process continues along the length of the elongated body 16 of gas generating material as all of the grains 70 are ignited successively. The ignitable surface areas provided by the cylindrical inner surfaces 80, and the fluid communication provided by the passages 82, promote rapid ignition of the grains 70 in this manner.

The inflation gas generated upon combustion of the grains 70 of gas generating material flows radially outward through the tubular screen 60 from the central portion 62 of the combustion chamber 34 to the plenum 64.

The inflation gas then impinges upon the surrounding inner surface 66 of the tubular body wall 20 throughout the entire length and circumference of the inner surface 66. This causes particulate combustion products that are carried with the inflation gas to adhere to the inner surface 66 as the inflation gas is cooled by absorption of heat in the body wall 20. The inner surface 66 functions as a particulate-deposition surface in this manner throughout the entire length and circumference of the combustion chamber 34.

Importantly, the central portion 62 of the combustion chamber 34 is closed at one end by the first end wall 22 of the housing 12, and is closed at its opposite end by the end wall 54 of the nozzle cup 50. The plenum 64 is closed at its opposite ends by the first end wall 22 and the intermediate wall 26. In this configuration, the housing 12 directs the inflation gas to flow from the combustion chamber 34 to the filter chamber 36 only through the nozzle structure defined by the nozzle cup 50 and the intermediate wall 26. More specifically, the inflation gas flows from the central portion 62 of the combustion chamber 34 to the plenum 64, and into the nozzle cup 50 through the openings 56. When the fluid pressure increases sufficiently, the inflation gas ruptures the burst foil 59 and begins to flow into the filter chamber 36 through the opening 58. All the inflation gas flowing from the combustion chamber 34 to the filter chamber 36 is thus constrained to flow at least partially through the plenum 64 so that a maximum amount of the inflation gas can impinge upon the particulate-deposition surface 66.

Additional particulate combustion products are retained within the filter 120 as the inflation gas flows radially outward through the gas-permeable structure of the filter 120. The filter 120 ensures that the inflation gas emerging from the outlet openings 14 is free of excessive particulate matter, even though the length of the filter 120 is substantially less than the length of the elongated body 16 of gas generating material. This is because the particulate-deposition surface 66 in the plenum 64 removes particulate matter from the inflation gas fully along the entire length, and fully around the entire circumference, of the elongated body 16 of gas generating material.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a housing defining a combustion chamber and storing a non-pressurized source of inflation fluid, said source of inflation fluid comprising an elongated body of ignitable material which, when ignited, generates combustion products including inflation gas and particulate matter; and a nozzle cup projecting axially into said combustion chamber, all of said inflation gas flowing through said nozzle cup, said housing having an imperforate tubular wall portion with an inner surface extending fully along and around said elongated body of ignitable material, said inner surface comprising means for removing particulate matter from said inflation gas, said housing further containing a tubular filter structure comprising gas-permeable material for removing additional particulate matter from said inflation gas, said tubular filter structure being substantially shorter than said elongated body of ignitable material, said housing further containing a burst foil separating said tubular filter structure from said nozzle cup.

2. Apparatus as defined in claim 1 wherein said tubular filter structure is spaced longitudinally from said elongated body of ignitable material.

3. Apparatus as defined in claim 1 wherein said inner surface defines an outer boundary of a plenum which extends fully and continuously along and around said elongated body of ignitable material.

4. Apparatus as defined in claim 3 wherein said housing includes outlet means for directing said inflation gas from said housing to inflate an inflatable device, and further includes means including said nozzel cup for constraining all of said inflation gas to flow at least partially through said plenum upon flowing to said outlet means.

5. Apparatus as defined in claim 4 wherein said outlet means consists of a plurality of outlet openings spaced longitudinally from said elongated body of ignitable material.

6. Apparatus as defined in claim 1 wherein said housing includes a tubular structure containing said elongated body of ignitable material in a combustion chamber, said inner surface defining an outer boundary of a plenum surrounding said tubular structure.

7. Apparatus as defined in claim 6 wherein said plenum is fully open and free of obstructions between said tubular structure and said imperforate tubular wall portion of said housing.

8. Apparatus comprising:

a housing storing a source of inflation fluid, said source consisting of an elongated body of ignitable material which, when ignited, generates combustion products including inflation gas and particulate matter, said housing defining a combustion chamber, a filter chamber, and an intermediate wall separating said combustion and filter chambers;

pyrotechnic material for generating combustion products that ignite said elongated body of ignitable material; and a nozzle cup projecting axially away from said intermediate wall and into said combustion chamber, all of said inflation gas flowing through said nozzle cup and through an opening in said intermediate wall, said housing having an imperforate tubular wall portion with an inner surface extending fully along and around said elongated body of ignitable material, said inner surface comprising means for removing particulate matter from said inflation gas, said housing further containing a burst foil for sealing said opening in said intermediate wall.

9. Apparatus as defined in claim 8 wherein said housing further contains a tubular filter structure comprising gas-permeable material for removing additional particulate matter from said inflation gas, said tubular filter structure being substantially shorter than said elongated body of ignitable material.

10. Apparatus as defined in claim 9 wherein said tubular filter structure is spaced longitudinally from said elongated body of ignitable material.

11. Apparatus as defined in claim 8 wherein said inner surface defines an outer boundary of a plenum which extends fully and continuously along and around said elongated body of ignitable material.

12. Apparatus as defined in claim 11 wherein said housing includes outlet means for directing said inflation gas from said housing to inflate an inflatable device, and further includes means including said nozzle cup for constraining all of said inflation gas to flow at least partially through said plenum upon flowing to said outlet means.

13. Apparatus as defined in claim 12 wherein said outlet means consists of a plurality of outlet openings spaced longitudinally from said elongated body of ignitable material.

14. Apparatus as defined in claim 8 wherein said housing includes a tubular structure containing said elongated body of ignitable material in a combustion chamber, said inner surface defining an outer boundary of a plenum surrounding said tubular structure.

15. Apparatus as defined in claim 14 wherein said plenum is fully open and free of obstructions between said tubular structure and said imperforate tubular wall portion of said housing.

16. Apparatus comprising:

a housing defining a combustion chamber and a filter chamber, said housing containing an elongated body of ignitable material which, when ignited, generates combustion products including inflation gas and particulate matter; and a nozzle cup projecting axially into said combustion chamber and away from said filter chamber, all of said inflation gas flowing through said nozzle cup, said combustion chamber having a peripheral plenum portion which is bounded by an imperforate tubular housing wall, said imperforate tubular housing wall having an inner surface which is spaced fully from said elongated body and which extends fully and continuously along and around said elongated body, said inner surface comprising means for removing particulate matter from said inflation gas, said housing including outlet means for directing said inflation gas from said filter chamber of said housing to inflate an inflatable device, and further including means for constraining all of said inflation gas to flow at least partially through said plenum upon flowing to said outlet means, said housing further containing a burst foil separating said combustion chamber from said filter chamber, and said housing still further containing a tubular filter structure comprising gas-permeable material for removing additional particulate matter from said inflation gas, said tubular filter structure being substantially shorter than said elongated body of ignitable material.

17. Apparatus as defined in claim 16 wherein said tubular filter structure is spaced longitudinally from said elongated body of ignitable material.

18. Apparatus as defined in claim 17 wherein said outlet means consists of a plurality of outlet openings spaced longitudinally from said elongated body of ignitable material.

19. Apparatus comprising:

a housing defining a combustion chamber and a filter chamber, said housing containing an elongated body of ignitable material which, when ignited, generates combustion products including inflation gas and particulate matter; and a nozzle cup projecting axially into said combustion chamber and away from said filter chamber, all of said inflation gas flowing through said nozzle cup, said combustion chamber having a peripheral plenum portion which is bounded by an imperforate tubular housing wall, said imperforate tubular housing wall having an inner surface which is spaced fully from said elongated body and which extends fully and continuously along and around said elongated body, said inner surface comprising means for removing particulate matter from said inflation gas, said housing including outlet means for directing said inflation gas from said filter chamber of said housing to inflate an inflatable device, and further including means for constraining all of said inflation gas to flow at least partially through said plenum upon flowing to said outlet means, said housing further containing a burst foil separating said combustion chamber from said filter chamber, and said housing still further including a tubular screen containing said elongated body of ignitable material in said combustion chamber, said plenum surrounding said tubular screen.

20. Apparatus as defined in claim 19 wherein said plenum is fully open and free of obstructions between said tubular screen and said imperforate tubular housing wall.

* * * * *